(12) United States Patent
Senft et al.

(10) Patent No.: US 9,194,658 B2
(45) Date of Patent: Nov. 24, 2015

(54) OPTICAL DEVICE

(71) Applicant: MBDA Deutschland GmbH, Schrobenhausen (DE)

(72) Inventors: Christoph Senft, Munich (DE); Alfred Fendt, Munich (DE); Juergen Zoz, Friedberg (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 0 days.

(21) Appl. No.: 14/193,817

(22) Filed: Feb. 28, 2014

(65) Prior Publication Data

US 2014/0246536 A1 Sep. 4, 2014

(30) Foreign Application Priority Data

Mar. 2, 2013 (DE) .......................... 10 2013 003 660

(51) Int. Cl.
| | |
|---|---|
| *F41G 7/22* | (2006.01) |
| *F41G 7/00* | (2006.01) |
| *G01S 17/32* | (2006.01) |
| *G01S 17/58* | (2006.01) |
| *G01J 5/10* | (2006.01) |
| *G01S 17/02* | (2006.01) |
| *G01S 17/42* | (2006.01) |
| *G01S 7/481* | (2006.01) |

(52) U.S. Cl.
CPC ............... *F41G 7/2293* (2013.01); *F41G 7/008* (2013.01); *F41G 7/2246* (2013.01); *F41G 7/2253* (2013.01); *G01J 5/10* (2013.01); *G01S 7/4812* (2013.01); *G01S 17/023* (2013.01); *G01S 17/32* (2013.01); *G01S 17/42* (2013.01); *G01S 17/58* (2013.01)

(58) Field of Classification Search
CPC ............. F41G 7/008; F41G 7/20; F41G 7/22; F41G 7/2273; F41G 7/2293; F41G 7/2246; F41G 7/2253; G01S 7/48; G01S 7/481; G01S 7/4811; G01S 7/4812; G01S 17/02; G01S 17/023; G01S 17/06; G01S 17/08; G01S 17/32; G01S 17/42; G01S 17/50; G01S 17/58; G01J 5/10
USPC ............ 244/3.1–3.3; 348/739, 744, 759, 766; 356/138, 140, 141.1–141.5; 250/336.1, 250/338.1, 353
See application file for complete search history.

(56) References Cited

U.S. PATENT DOCUMENTS

| | | | | |
|---|---|---|---|---|
| 4,024,392 A | * | 5/1977 | Teppo et al. | 244/3.16 |
| 4,105,174 A | * | 8/1978 | Blomqvist et al. | 244/3.16 |
| 4,497,065 A | * | 1/1985 | Tisdale et al. | 244/3.15 |
| 4,733,609 A | * | 3/1988 | Goodwin et al. | 244/3.16 |
| 4,796,834 A | * | 1/1989 | Ahlstrom | 244/3.16 |
| 4,894,724 A | * | 1/1990 | Welkowsky | 348/766 |

(Continued)

FOREIGN PATENT DOCUMENTS

| | | |
|---|---|---|
| DE | 10 2007 014 256 A1 | 9/2008 |
| GB | 2 448 052 A | 10/2008 |

*Primary Examiner* — Bernarr Gregory
(74) *Attorney, Agent, or Firm* — Crowell & Moring LLP

(57) ABSTRACT

An optical device for a missile seeker head includes an optical sensor with a plurality of pixels, a light source, a detection device, and an optical system. The light source is configured to illuminate, using the optical system, an object that can be mapped using the optical system on at least one subarea of a predefined pixel of the optical sensor. The detection device is configured to detect the light emitted from the light source and reflected by the object.

11 Claims, 2 Drawing Sheets

(56) References Cited

U.S. PATENT DOCUMENTS

Figure 1:
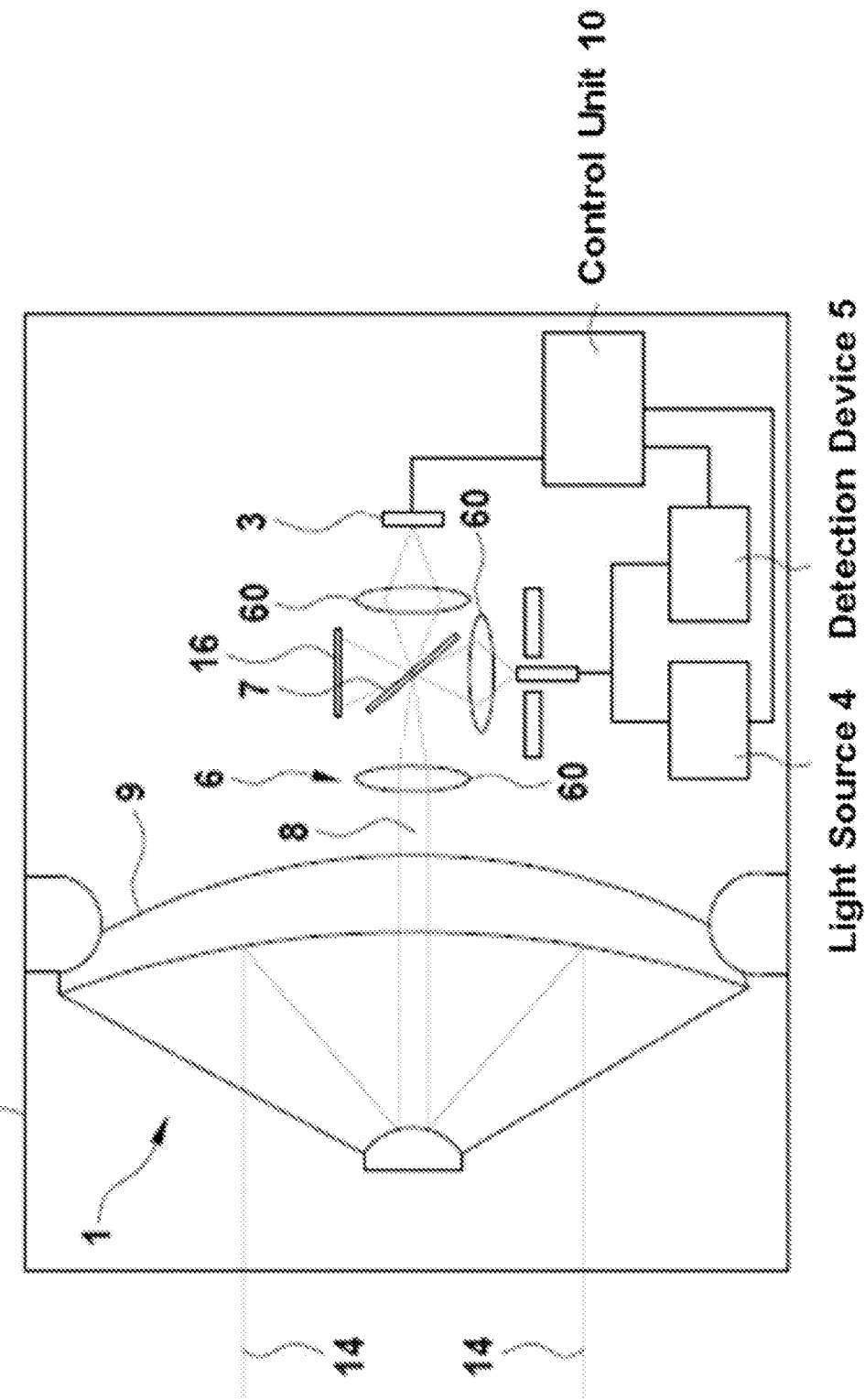

| | | | |
|---|---|---|---|
| 5,088,659 A * | 2/1992 | Neff et al. | 244/3.16 |
| 6,145,784 A * | 11/2000 | Livingston | 244/3.11 |
| 6,198,564 B1 * | 3/2001 | Knight | 244/3.16 |
| 6,199,794 B1 * | 3/2001 | Naiman et al. | 244/3.16 |
| 6,262,800 B1 * | 7/2001 | Minor | 244/3.16 |
| 6,410,897 B1 * | 6/2002 | O'Neill | 244/3.16 |
| 6,741,341 B2 * | 5/2004 | DeFlumere | 356/141.1 |
| 7,221,436 B1 * | 5/2007 | Mendenhall et al. | 244/3.16 |
| 7,575,190 B2 * | 8/2009 | Sallee | 244/3.16 |
| 2004/0021852 A1 | 2/2004 | DeFlumere | |

* cited by examiner

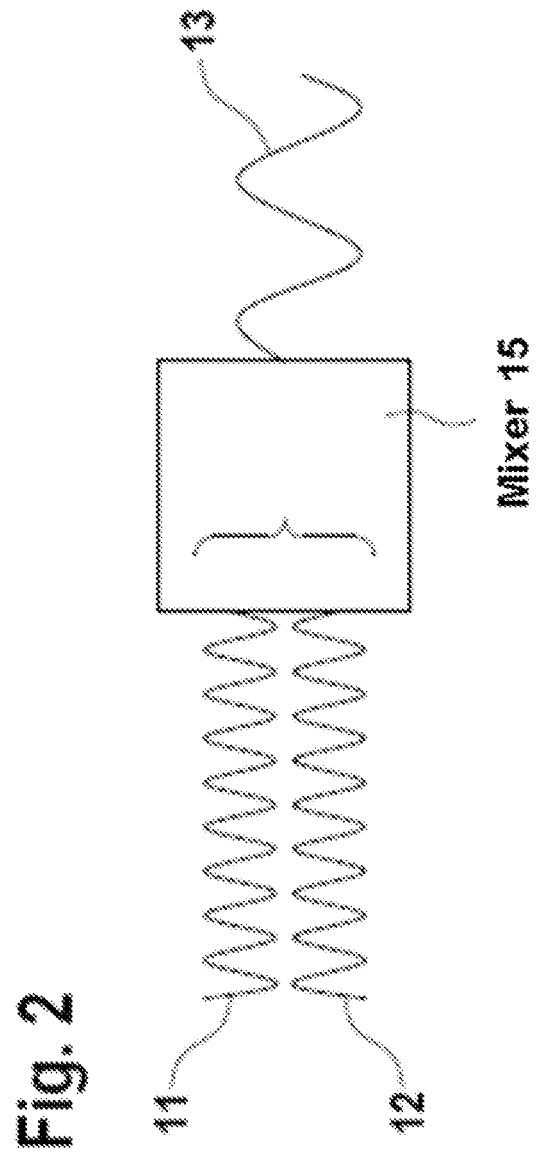

OPTICAL DEVICE

BACKGROUND AND SUMMARY OF THE INVENTION

Exemplary embodiments of the present invention relate to an optical device, in particular, for use in seeker heads of missiles. Passive infrared (IR) seeker heads for missiles, where the IR seeker heads can recognize, for example, rockets or other target objects, which are to be detected, by means of their optical signature are known. These signatures represent the distribution of reflected or emitted radiation intensity on the surface of the target. The signatures enable the seeker head to recognize target objects and permit a coarse target localization in the two dimensional angular space, but the signatures deliver only very inaccurate data about the state of motion, the distance and the three dimensional structure of these target objects.

Particularly in the case of dynamic targets the hit accuracy could be improved by means of a high resolution temporal measurement of their distance in relation to the seeker head and by means of their relative motion in all three degrees of freedom. Similarly it would be possible to facilitate the classification of the targets and a real target/false target discrimination through the acquisition of the depth dimension of the respective target object together with the measurement of the nominal angular velocity.

It is known from the state of the art that passive seeker heads are supported by radar sensors, in order to obtain the aforementioned advantages. The radar sensors help to significantly improve the data about the target objects. However, the size and the architecture of the radar sensors make it difficult to integrate them into a seeker head, so that for this reason the radar sensors are often provided, for example, as external sensors independent of the seeker head.

Exemplary embodiments of the present invention provide an optical system, with which, in particular, a seeker head can be operated. In this case both the inexpensive production and assembly of the optical system make it possible to provide reliable and detailed data about the target.

The optical device comprises at least one optical sensor with a plurality of pixels, at least one light source, at least one detection device and an optical system. The light source is configured, according to the invention, in such a way that it illuminates an object by means of the optical system. For the illumination with the light source the object can be mapped by means of the optical system onto at least one subarea of a predefined pixel of the optical sensor. In this way the light source and the optical sensor are coupled. The optical device is thus configured from the start with a pixel of the optical sensor mapping to that area of the surrounding area that can be illuminated by the light source. This optical (axis) harmonization is implemented preferably by means of a retroreflector, by means of which the light source can illuminate the optical sensor with a proper wavelength. If the area to be illuminated is smaller than a pixel of the optical sensor, then the light source together with the detection device is configured to determine that portion of the pixel that maps the area. i.e. to determine the deviation angle of the target with sub-pixel accuracy. The detection device is configured to detect light emitted from the light source and reflected at the object. In particular, the detection device is configured to detect the reflected light by means of the optical system. Preferably a very accurate measurement of the distance and/or the in-range profile is possible by means of suitable modulation techniques, such as the frequency, the polarization, the phase or the amplitude. Furthermore, the optical device makes it possible to determine the velocity and/or the velocity profile of the object by means of a Doppler evaluation. Finally the optical device forms preferably a very compact component that can be installed in a seeker head of a missile.

In addition, the invention relates to a method for operating a seeker head of a missile. In this case the seeker head comprises at least one optical sensor with a plurality of pixels, at least one light source, and at least one detection device. Furthermore, the seeker head includes an optical system, wherein the light source is configured to illuminate an object by means of the optical system, and wherein the object can be mapped by means of the optical system onto at least one predefined pixel of the optical sensor. Furthermore, the detection device is configured to detect the light that is emitted from the light source and is reflected at the object. The method according to the invention comprises the following steps. First of all, a target is sensed by means of the optical sensor or preferably by means of an infrared sensor; and a first direction, in which the target is located in relation to the missile, is outputted. This occurs as soon as the distance between the target and the missile falls below a first predefined value. Then the target is illuminated by means of the light source, as soon as the distance between the target and the missile falls below a second predefined value. Then the light, which is emitted from the light source and is reflected from the target, is detected by the detection device. Finally the distance between the target and the missile is determined, in particular, by means of a run-time measurement and/or modulation techniques; and/or a second direction, in which the target is located in relation to the missile, is determined; and/or a relative velocity between the target and the missile is determined, in particular, by means of Doppler techniques. Preferably the first direction represents only an approximate direction, in which the target is located in relation to the missile, while the second direction represents a more accurate direction than the first direction. Hence, the optical sensor can recognize where the target is located in relation to the missile, while an exact measurement can be carried out by means of the light source and the detection device within the direction specified by the optical sensor. Therefore, the second direction can be determined very quickly, because the light source and the detection device are already informed in essence about the location, at which the target has to be located. Precise data about the relative velocity and/or the distance and/or the differentiation between the real target and a false target by means of Doppler profiles and/or in-range profiles can be made available in an advantageous way by illuminating the target by means of the light source and by detecting the reflected light. As a result, the method according to the invention can provide a missile with a plethora of data, so that an accurate guidance of the missile to the target is possible.

Preferably the light source is a laser source. Even more highly preferred is that the laser source is an infrared laser source. For example, the laser source can emit coherent continuous and/or coherent pulsed radiation at high peak power. In this way the working range, in which the detection device can detect the reflected light of the light source, can be increased. In addition, the detection device can determine preferably the run time of the individual pulses, in order to perform the distance measurements. Moreover, the detection device can deliver preferably data, which are necessary for determining the relative velocity of the object in relation to the optical device, by means of additional examinations of the reflected light of the light source.

The optical device is designed advantageously in such a way that the optical system has a dichroic beam splitter configured to separate the optical radiations to the optical sensor or to the detection device from a common beam path and/or configured to integrate the light of the light source into a common beam path. The use of the optical system to separate and/or integrate the optical radiations allows a compact design of the optical device. In addition, the use of the beam splitter makes it possible, in particular, for multiple components to have the same viewing angle of the surrounding area. A control of the harmonization is possible preferably by means of the above described retroreflector.

The optical system has a lens (refracting) optical system and/or a mirror (reflecting) optical system. The mirror optical system preferably has a focal length of 600 mm and preferably has a diameter of 300 mm. Furthermore, it is preferred that the reflector telescope projects the above described common beam path onto the optical system.

In an additional advantageous embodiment of the invention the detection device is connected to a control unit. The control unit is configured preferably to carry out a heterodyne detection and/or, even more highly preferred, also a homodyne detection of the received optical radiation. The heterodyne detection allows a long working range, in which the light source can illuminate the object and in which the detection device can detect the light that is emitted from the light source and is reflected from the object. Furthermore, the heterodyne detection advantageously permits the acquisition of velocity data and/or profile data of the object. In order to carry out the heterodyne detection, the light that is received by the detection device is converted into an electric signal that is emitted preferably to the control unit.

Furthermore, it is preferred that the detection device has one or more pixels. The use of a plurality of pixels allows the design as an imaging sensor, so that the detection device can carry out with each available pixel its own detection of the light reflected at the object. Therefore, it is possible to differentiate between various light intensities within the detection range of the detection device. Furthermore, individual velocities and/or distances and/or profiles can be measured preferably with the pixels. As an alternative or in addition, the detection device can have at least one light guide, in particular a glass fiber, so that a flexible spatial arrangement of the detection device is possible.

Furthermore, the invention relates to a seeker head for a missile; and this seeker head comprises, as describe above, an optical device. One advantage is that the optical device can be constructed in a very compact manner, so that this optical device lends itself to be preferably a part of a seeker head. Furthermore, the light source and the detection device make it possible to use not only the optical sensor, but also an additional measuring device, with which the seeker head can optimally guide the missile.

Preferably the method according to the invention is carried out in that the detection device emits the detected light as a first signal, which is mixed with a signal designed as a predefined harmonic oscillator. The result is an intermediate signal, which is used preferably to determine an amplitude and/or a frequency and/or a phase of the first signal. The mixing is performed preferably optically, even more highly preferred with the light of the light source. In this way a homodyne detection is implemented. As an alternative, it is even more highly preferred that the mixing is done with an additional light source. In this case a heterodyne detection is implemented. Since the intermediate signal can be better evaluated, the mixing of the first signal with the second signal allows a very accurate evaluation of the first signal and, as a result, a very long working range of the detection device. In particular, if the first signal is a high frequency signal and, thus, a signal that is technically difficult to use, the mixture with the second signal offers an advantageous way to determine the parameters of the first signal.

Preferably the first predefined value is at least 600 km, and/or the second predefined value is at least 35 km. As a result, the optical sensor can already determine a first direction very early, whereas the more accurate determination of the second direction by means of the detection device does not take place until later, when the distance between the missile and the target has decreased.

BRIEF DESCRIPTION OF THE DRAWING FIGURES

At this point the invention is explained in detail by means of some exemplary embodiments with reference to the accompanying drawings. The drawings show in FIG. 1 a schematic configuration of the optical device according to one exemplary embodiment of the invention; and FIG. 2 a schematic representation of the heterodyne detection, as used by the optical device according to the exemplary embodiment of the invention.

DETAILED DESCRIPTION

FIG. 1 shows an optical device 1, which can be, in particular, a part of a seeker head 2 of a missile. The optical device 1 comprises a reflector telescope 9, which bundles the optical radiations 14 from the surrounding area of the optical device 1 and passes these optical radiations as a common beam path 8 to an optical system 6. The optical system 6 comprises a plurality of lenses 60 and a dichroic beam splitter 7 and is configured to divide the common beam path 8, in order to guide this common beam path to an optical sensor 3 and to a detection device 5. The optical sensor 3 is, in particular, an infrared sensor with a plurality of pixels; and this infrared sensor can recognize a target by means of its optical signature. This signature represents, in particular, the distribution of the reflected or emitted radiation intensity on the surface of the target.

Furthermore, the dichroic beam splitter 7 of the optical system 6 makes it possible for a light source 4 to introduce light into the common beam path 8, while it is possible for the detection device 5 to detect the light of the light source 4 that is reflected from the target inside the common beam path 8. Therefore, it is possible with the optical device 1 according to the invention to use together the optical sensor 3, the light source 4, and the detection device 5, because they always use a common beam path 8. Furthermore, it is possible to connect the optical sensor 3 and the light source 4 to each other in such a way that the light source 4 can be allocated a pixel of the optical sensor 3, so that the light source 4 illuminates precisely the area of the target that is mapped on the allocated pixel. The allocation occurs by way of a retroreflector 16, which reflects by way of the dichroic beam splitter 7 the light of the light source 4 having a suitable wavelength onto the allocated pixel of the optical sensor 4. As a result, an optical harmonization is possible. The optical harmonization of the light source 4 and the optical sensor 3 can also be implemented preferably by means of additional light sources that emit, in particular, light that differs from the wavelength of the light of the light source. In the event that the target to be illuminated is smaller than the pixel of the optical sensor 3, then the light source 4 together with the detection device 5 is configured to determine that portion of the pixel that maps the target.

The optical sensor 3, the light source 4 and the detection device 5 are connected to a control unit 10 that performs a heterodyne detection. The heterodyne detection is shown in schematic form in FIG. 2. The light, which is to be detected by the detection device 5, is represented as a first signal 11, which is mixed by a mixer 15, preferably by a photodiode, with a second signal 12, which is emitted preferably from the light source 4 or from an alternative light source. The second signal 12 is preferably a predefined harmonic oscillator. This arrangement produces an intermediate signal 13, which can be processed by the control unit 10. Since the second signal 12 has, as a harmonic oscillator, known parameters, it is very easy to determine the parameters of the first signal 11 from the intermediate signal 13. In this way a very accurate examination of the first signal 11 and, thus, the reflected light is possible. As a result, it is possible to achieve a very high degree of accuracy with the detection device 5.

For example, the seeker head 2 can be mounted in an exo-atmospheric interceptor rocket. The reflector telescope 9 can have, in particular, a focal length of approximately 600 mm and a diameter of 300 mm. In this case the reflector telescope focuses the light emission in the infrared range of the target, starting at a distance of, in particular, 600 km. As a result, already at this distance the optical sensor 3 can sense the target. Hence, an initial guidance of the interceptor rocket to the target is possible, even if this guidance is still very inaccurate. At a distance of, in particular, 35 km it is possible to illuminate the target by means of the light source 4 using the reflector telescope 9. Due to the heterodyne detection of the light, which is received by the detection device 5 and which, coming from the light source 4, was reflected at the target, it is now possible to obtain additional precise data about the velocity and/or the distance of the target. The net result is that the flight guidance of the interceptor rocket by means of the seeker head 2 is significantly improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 1 optical device
2 seeker head
3 optical sensor
4 light source
5 detection device
6 optical system
60 lens
7 dichroic beam splitter
8 common beam path
9 reflector telescope
10 control unit
11 first signal
12 second signal
13 intermediate signal
14 optical radiation
15 mixer
16 retroreflector

What is claimed is:

1. An optical device of a missile seeker head, the optical device comprising:
an optical sensor with a plurality of pixels;
a light source;
a detection device; and
an optical system;
wherein the light source is configured to illuminate, using the optical system, an object that can be mapped by the optical system on at least one subarea of a predefined pixel of the optical sensor; and
wherein the detection device is configured to detect light emitted from the light source and reflected by the object.

2. The optical device of claim 1, wherein the light source is a laser light source.

3. The optical device of claim 2, wherein the laser light source is an infrared laser light source.

4. The optical device of claim 1, wherein the optical system comprises:
a dichroic beam splitter configured to
separate optical radiations from a common beam path to the optical sensor or to the detection device, or
integrate the light of the light source into a common beam path.

5. The optical device of claim 1, wherein the optical system comprises a lens optical system or a reflector telescope.

6. The optical device of claim 1, wherein the detection device is connected to a control unit, wherein the control unit is configured to carry out a heterodyne or homodyne detection of the received optical radiation.

7. The optical device of claim 1, wherein the detection device comprises one or more pixels or at least one light guide.

8. A missile seeker head, comprising:
a missile seeker head housing; and
an optical device, which comprises
an optical sensor with a plurality of pixels;
a light source;
a detection device; and
an optical system;
wherein the light source is configured to illuminate, using the optical system, an object that can be mapped by the optical system on at least one subarea of a predefined pixel of the optical sensor; and
wherein the detection device is configured to detect light emitted from the light source and reflected by the object.

9. A method for operating a missile seeker head of a missile, wherein the seeker head comprises an optical sensor with a plurality of pixels, a light source, a detection device, and an optical system, wherein the light source is configured to illuminate, using the optical system, an object that can be mapped by the optical system on at least one subarea of a predefined pixel of the optical sensor, and wherein the detection device is configured to detect light emitted from the light source and reflected by the object, the method comprising the steps:
sensing, by the optical sensor, a target and outputting a first direction in which the target is located in relation to the missile, as soon as a distance between the target and the missile falls below a first predefined value;
illuminating, by the light source, the target as soon as a distance between the target and the missile falls below a second predefined value;
detecting, by the detecting device, the light emitted from the light source and reflected from the target, by means of the detection device; and
determining
the distance between the target and the missile using modulation or a run time measurement;
a second direction in which the target is located in relation to the missile; or
a relative velocity between the target and the missile using Doppler techniques.

10. The method of claim 9, further comprising the steps:
generating an intermediate signal by optically mixing the light detected by the detection device as a first signal with a second signal that is a predefined harmonic oscillator; and
determining an amplitude, a frequency, or a phase of the first signal from the intermediate signal.

11. The method of claim 9, wherein the first predefined value is at least 600 kilometers or the second predefined value is at least 35 kilometers.

* * * * *